US012436722B2

(12) United States Patent
Krishnan

(10) Patent No.: US 12,436,722 B2
(45) Date of Patent: Oct. 7, 2025

(54) DISTRIBUTING MULTIMEDIA CONTENT TO DIGITAL-SIGNAGE DEVICES

(71) Applicant: Adobe Inc., San Jose, CA (US)

(72) Inventor: Kalyanaraman Balasubramaniam Krishnan, Milpitas, CA (US)

(73) Assignee: Adobe Inc., San Jose, CA (US)

(*) Notice: Subject to any disclaimer, the term of this patent is extended or adjusted under 35 U.S.C. 154(b) by 0 days.

(21) Appl. No.: 18/196,544

(22) Filed: May 12, 2023

(65) Prior Publication Data

US 2024/0378004 A1    Nov. 14, 2024

(51) Int. Cl.
*G09G 5/00* (2006.01)
*G06F 3/14* (2006.01)
*G09F 9/30* (2006.01)

(52) U.S. Cl.
CPC . *G06F 3/14* (2013.01); *G09F 9/30* (2013.01)

(58) Field of Classification Search
CPC .......... G06F 3/14; G06F 3/0485; G06F 9/451; G09F 9/30
USPC .............................................................. 345/2
See application file for complete search history.

(56) References Cited

U.S. PATENT DOCUMENTS

| 2012/0324324 A1* | 12/2012 | Hwang | G11B 27/11 715/203 |
| 2014/0173625 A1* | 6/2014 | Kumar | G06F 9/4843 718/106 |
| 2016/0353255 A1* | 12/2016 | Wang | H04W 4/06 |
| 2017/0092270 A1* | 3/2017 | Newendorp | G10L 15/22 |
| 2020/0026533 A1* | 1/2020 | Gehlsen | G06F 9/451 |

OTHER PUBLICATIONS

Play Digital Signage, Inc., "Tags in Digital Signage", available at https://playsignage.com/tags-digital-signage/, Apr. 2022, 8 pages.

* cited by examiner

*Primary Examiner* — Jennifer T Nguyen
(74) *Attorney, Agent, or Firm* — Kilpatrick Townsend & Stockton LLP

(57) ABSTRACT

Methods and systems disclosed herein relate generally to automatically distributing multimedia content based on device identifiers of digital-signage devices. A content-management application accesses a set of multimedia-content items, in which the set of multimedia-content items are associated with a content identifier. The content-management application detects a digital-signage device is registered to access the content-management application. The digital-signage device is associated with a device identifier. The content-management application executes one or more data-processing rules to determine that the content identifier matches at least part of the device identifier of the digital-signage device. In response to determining that the content identifier matches at least part of the device identifier of the digital-signage device, the content-management application transmits the set of multimedia-content items to the digital-signage device.

17 Claims, 7 Drawing Sheets

DISTRIBUTING MULTIMEDIA CONTENT TO DIGITAL-SIGNAGE DEVICES

TECHNICAL FIELD

This disclosure generally relates to configuring multimedia content in digital-signage devices. More specifically, but not by way of limitation, this disclosure relates to automatically distributing multimedia content based on device identifiers of digital-signage devices.

BACKGROUND

Digital-signage devices electronically displays video or other multimedia content for various purposes, such as television programming, menus, information, advertising, and other types of messages. The digital-signage devices include standalone display devices configured to access multimedia content over a network. In some instances, the digital-signage devices include display devices coupled with media player boxes, in which the media player boxes are configured to access the multimedia content and stream the multimedia content through the display devices. Digital-signage devices are installed in various indoor and outdoor locations. To obtain the multimedia content, a technician can register or connect installed digital-signage devices to an asset-management system. Once the digital-signage devices are registered, a content-management application provides the multimedia content to the digital-signage devices for display.

Typically, a content provider operates several digital-signage devices across various locations, and the digital-signage devices operated by the content provider display different multimedia content based on their respective installed locations. For example, a digital-signage device installed in a Japanese retailer would display multimedia content in Japanese and English, while another digital-signage device installed in New York would display multimedia content in English only. To distribute different multimedia content to different devices, the content provider manually accesses each registered digital-signage device, selects the appropriate multimedia content, and transmits the selected multimedia content to the digital-signage device. Such individual configuration can be feasible for a small number of digital-signage devices, but the effort becomes substantially more cumbersome and challenging for content providers that operate a large number of digital-signage devices.

SUMMARY

Certain embodiments involve automatically distributing multimedia content based on device identifiers of digital-signage devices. A content-management application accesses a set of multimedia-content items, in which the set of multimedia-content items are associated with a content identifier. The content-management application detects a digital-signage device is registered to access the content-management application. The digital-signage device is associated with a device identifier. The content-management application executes one or more data-processing rules to determine that the content identifier matches at least part of the device identifier of the digital-signage device. In response to determining that the content identifier matches at least part of the device identifier of the digital-signage device, the content-management application transmits the set of multimedia-content items to the digital-signage device.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
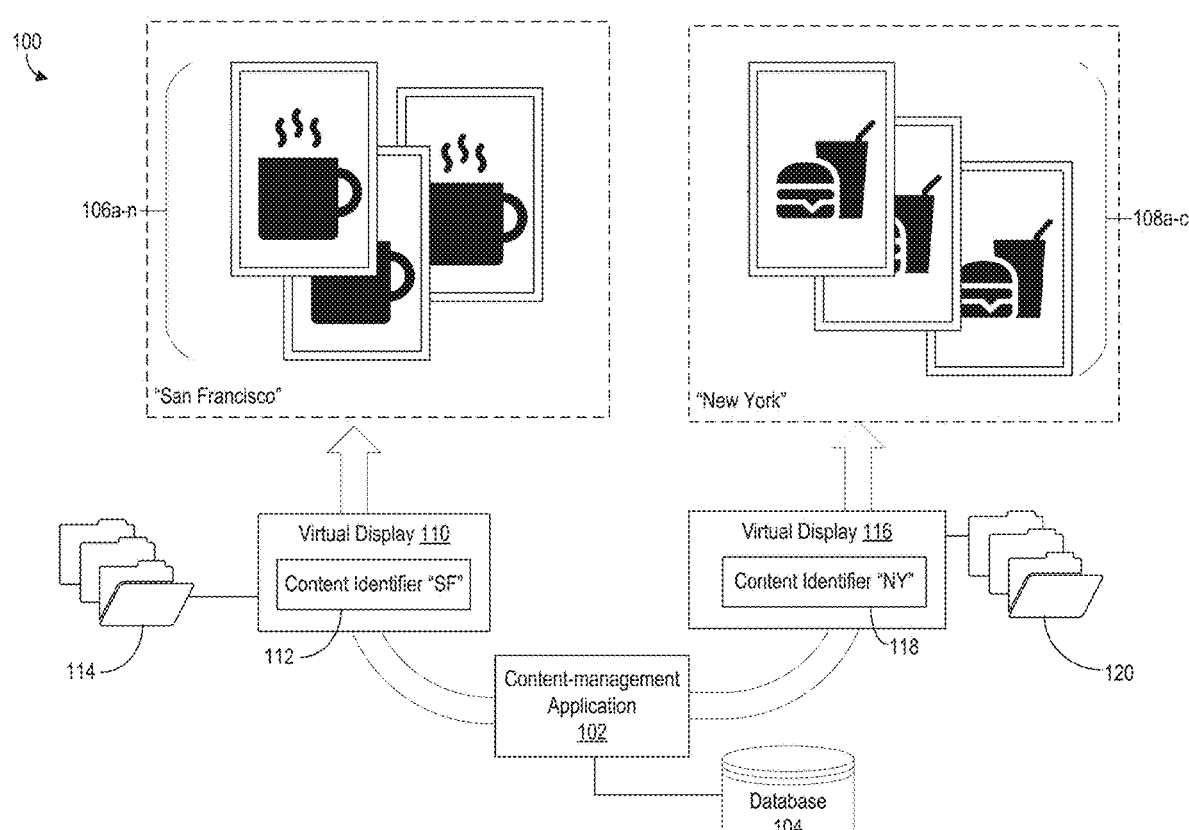
FIG. 1 illustrates an example schematic diagram for automatically distributing multimedia content to digital-signage devices, in accordance with some embodiments.

Conventional techniques for distributing multimedia content to digital-signage devices include manually accessing each registered digital-signage device, selecting the appropriate multimedia content, and transmitting the selected multimedia content to the digital-signage device. For example, a technician installs and registers a set of digital-signage devices at a given location (e.g., a restaurant), but would need to configure each of the digital-signage devices to download the appropriate multimedia content from the content management server. Then, the technician needs to confirm with the content provider that the multimedia content has been properly downloaded and displayed on the digital-signage devices. As shown in the above example, the process involves interactions between multiple entities to individually transmit the multimedia content to the digital-signage devices. Although the above technique can be performed for a small number of devices (e.g., 10, 20), individually configuring distribution of multimedia content across hundreds or thousands of digital-signage devices can be inefficient, cumbersome, and challenging.

Certain embodiments described herein can address these problems by automatically selecting and transmitting multimedia-content items to corresponding digital-signage devices based on content identifiers. To ensure that the multimedia content are distributed to the correct set of digital-signage devices, a content-management application executes one or more data-processing rules to identify a content identifier that includes an expression that matches at least part of a device identifier of a digital-signage device, identifies multimedia-content items that are associated with the identified content identifier, and transmits the identified multimedia-content items to the digital-signage device. Such process can be automatically repeated for a large number of digital-signage devices, thus reducing the need for manually and individually assigning multimedia content to the digital-signage devices.

The content-management application accesses a first set of multimedia-content items and a second set of multimedia-content items. The content management application stores a plurality of multimedia-content items including the first and second sets of multimedia-content items. Each of multimedia-content items is associated with a content identifier, which includes an expression that matches at least part of a device identifier of a digital-signage device. In some instances, a data object (e.g., a playlist) stores the first or second set of multimedia-content items, in which the data object is associated with a content identifier. A multimedia-content item of the first or second sets of multimedia-content items includes a video file, an image file, or an audio file. The first set of multimedia-content items are associated with a first content identifier. The second set of multimedia-content items are associated with a second content identifier, in which the first content identifier is different from the second content identifier. Each of the first or second content identifier is configured to include an expression that matches at least part of a device identifier of a digital-signage device. In some instances, the multimedia-content items are associated with two or more content identifiers.

As an illustrative example, franchise restaurants display multimedia content through their respective digital-signage devices, in which some of them display their custom menus. The custom menus would differ based on the location of the franchise restaurant, or the food items may have different prices depending on the location. Continuing with the above example, the first set of multimedia-content items include images and videos that depict breakfast burritos and quiche, and are associated with the first content identifier "SF*". The second set of multimedia-content items include images and videos that depict bagels and donuts, and are associated with the second content identifier "NY."

The content-management application detects that a digital-signage device is registered to access the content-management application. Continuing with the example, the digital-signage device is installed in San Francisco, at which the digital-signage device is configured to display a custom menu that is specific to restaurants located in San Francisco. The digital-signage device includes a device identifier that includes information that identify one or more characteristics of the digital-signage device. For example, the device identifier includes information indicative of the digital-signage device being installed at a particular location. In another example, the device identifier includes a serial number of the digital-signage device. In some instances, the device identifier is determined for the digital-signage device in accordance with a naming convention followed by an asset-management system that perform large-scale deployments of digital-signage devices.

Continuing with the example, the digital-signage device includes the device identifier "SF_device_99," which identifies the city at which the digital-signage device is installed. In some instances, the device identifier includes a device name of the digital-signage device, a location at which the digital-signage device will be installed, an operating system associated with the digital-signage device, or a device serial number of the digital-signage device.

The content-management application executes one or more data-processing rules to determine that the first content identifier matches at least part of the device identifier of the digital-signage device, in response to detecting that the digital-signage device is registered. Continuing with the example, the content-management application executes the one or more data-processing rules to identify the first content identifier that includes the expression "SF*", in which the expression "SF*" matches at least part of the device identifier "SF_device_99." As a result, the data-processing rule is executed to identify multimedia content that are configured to be displayed by digital-signage devices that are installed in San Francisco.

The content-management application transmits the first set of multimedia-content items to the digital-signage device over a communication network, in response to identifying the first content identifier. Transmitting the first set of multimedia-content items facilitates the digital-signage device to display at least one multimedia-content item of the first set of multimedia-content items. Continuing with the above example, the content-management application automatically transmits the images and videos depicting breakfast burritos and quiche to the digital-signage device. Once the images and videos are accessed, the digital-signage device displays a custom menu that includes the images and videos of breakfast burritos and quiche. The content-management application repeats the process for other digital-signage devices in similar or other locations such that the corresponding multimedia content is distributed.

Certain embodiments described herein are directed to an improvement from content-management applications that manually and individually assign multimedia content to the digital-signage devices. Certain embodiments are also advantageous if an existing digital-signage device is to be replaced with another digital-signage device. Instead of manually identifying and assigning the multimedia content again to the new digital-signage device, the content-management application can automatically transmit the multimedia content to the new digital-signage device as soon as it is registered. For example, a retail store has 9-10 digital-signage devices displaying various multimedia content, but one of the devices begins to malfunction. A replacement digital-signage device can then be installed and registered, at which the corresponding multimedia content can be automatically transmitted by the content-management application based on the corresponding content identifiers. The replacement digital-signage device can display the correct multimedia content again, without the need for the content provider to manually assign the multimedia content to the replacement digital-signage device. Certain embodiments can thus reduce the time and resources needed for distributing multimedia content to digital-signage devices across various locations.

I. DEFINITIONS

As used herein, the term "content identifier" refers to one or more alphanumerical characters are associated (e.g., tagged, appended) with one or more multimedia-content items. The content identifier includes information used for identifying digital-signage devices having device identifiers that substantially match the information.

As used herein, the term "device identifier" refers to one or more alphanumerical characters that identify one or more characteristics of a digital-signage device. For example, the device identifier includes information indicative of the digital-signage device being installed at a particular location. In another example, the device identifier includes a serial number of the digital-signage device.

As used herein, the term "multimedia content" refers to any image, video, and/or audio content that can be displayed by a display device. The multimedia content can include interactive content that allows interactions with a user while it is being displayed on the digital signage device.

As used herein, the term "virtual-display object" refers to a data object or a data container that includes a content identifier. The virtual-display object can be associated or linked to multimedia-content items and/or playlists that store the multimedia-content items. The content identifier of the virtual-display object propagates to the multimedia-content items that are associated with the virtual-display object.

As used herein, the term "playlist" or "channel" refers to a data object that stores one or more multimedia-content items. In some instances, each playlist includes additional configurations that specify how the corresponding multimedia-content items should be displayed by a digital-signage device. For example, the playlist can be configured to instruct the digital-signage device to display a sequence of the one or more multimedia-content items, or simultaneously display a combination of the one or more multimedia-content items (e.g., in a single page). In another example, the playlist can be configured to instruct the digital-signage device to display the one or more multimedia-content items at a particular time range.

II. OVERVIEW

A. Example Schematic Diagram for Distributing Multimedia Content to Digital Signage Devices FIG. 1 illustrates an example schematic diagram 100 for automatically distributing multimedia content to digital-signage devices, in accordance with some embodiments. In FIG. 1, a content-management application 102 accesses multimedia content stored in a database 104 and transmits the multimedia content to digital-signage devices 106a-c and 108a-c. The content-management application 102 generates a content identifier for a set of multimedia-content items, such that the set of multimedia-content items with the content identifier can be transmitted automatically to any digital-signage devices having device identifiers that match the content identifier. As a result, the content identifier includes information (e.g., location of the digital-signage device, serial number of the digital-signage device) that indicate digital-signage devices for which the multimedia content should be distributed. For example, a content identifier identifies a location, at which digital-signage devices installed on such location can receive multimedia content that are associated with the content identifier. In another example, another content identifier includes alphanumerical characters, at which digital-signage devices having serial numbers that match the set of alphanumerical characters can receive multimedia content that are associated with the other content identifier.

In some instances, the content identifier includes information that identify multiple characteristics associated with a digital-signage device. For example, the multimedia-content item is associated with a first content identifier that identifies a location (e.g., "SF") and a second content identifier that identifies a particular operating system of a digital-signage device (e.g., "ChromeOS").

In some instances, rather than individually assigning each multimedia-content item with a corresponding content identifier, the content-management application 102 utilizes a virtual-display object having one or more content identifiers. The content-management application 102 associates the virtual-display object with one or more playlists of multimedia-content items, such that the one or more content identifiers of the virtual-display object are applied to all of the multimedia-content items stored in the playlists. Once the virtual-display object is generated and stored in a database, the content-management application can access and transmit the multimedia-content items associated with the virtual-display object to a digital-signage device, if the one or more content identifiers of the virtual-display object matches at least part of a device identifier of the digital-signage device. Such automated content-management protocol using the virtual-display objects further increases efficiency of distributing multiple multimedia-content items to different digital-signage devices.

In some instances, each playlist includes additional configurations that specify how the corresponding multimedia-content items should be displayed by a digital-signage device. For example, a first playlist specifies the digital-signage device to display its corresponding multimedia-content items between 7:00-10:30 AM in sequential order, while a second playlist specifies the digital-signage device to display its corresponding multimedia-content items between 11:00-4:00 PM in random order. In effect, the digital-signage device receiving the first and second playlists can display the multimedia content in accordance with the specifications indicated by the first and second playlists.

Continuing with FIG. 1, the content-management application 102 can configure the digital-signage devices 106a-c to display an image of a coffee cup and associate the digital-signage devices 106a-c with a particular location ("San Francisco"). The content-management application 102 also configures the digital-signage devices 108a-c to display an image of a sandwich and drink as well as associate the digital-signage devices 108a-c another location ("New York"). The digital-signage devices 106a-c and 108a-c include device identifiers that indicate their respective device characteristics. For example, a device identifier of a digital-signage device 106a is a serial number that identifies its manufacturer. In another example, the device identifier is a host name that identifies a location (e.g., "SF_device_99") at which the digital-signage device will be installed. In some instances, an asset-management system modifies at least part of the device identifier of one of the digital-signage devices 106a-c and 108a-c, to facilitate transmittal of multimedia content having the corresponding content identifier. For example, the asset-management system can access device properties of the digital-signage devices 108a-c then modify their respective device host names to include location information (e.g., "NY") at which the digital-signage devices 108a-c will be installed. In some instances, the asset-management system modifies device identifiers of the digital-signage devices in batches, to increase efficiency in applying the relevant information to the digital-signage devices.

The distribution of multimedia content is initiated as the digital-signage devices 106a-c and 108a-c are installed in their respective locations (e.g., retail store, airports, restaurants). The digital-signage devices 106a-c and 108a-c can then be registered with the content-management application 102. As the digital-signage devices 106a-c and 108a-c are registered, the content-management application 102 executes one or more data-processing rules to identify content identifiers that matches at least part of the device identifiers of the digital-signage devices 106a-c and 108a-c.

The multimedia content having the identified content identifiers are then automatically transmitted to the corresponding digital-signage devices (e.g., the digital-signage device 108b). As an illustrative example, a technician installs a digital-signage device on a restaurant and registers the digital-signage device with a content-management application. The digital-signage device includes a device identifier that indicates a location at which the digital-signage device was installed. The content-management application identifies one or more multimedia-content items having content identifiers (e.g., "SF") that match at least part of the device identifier (e.g., "SF_device_99"). The content-management application then transmits the one or more multimedia-content items to the digital-signage device, at which the digital-signage device can display the transmitted multimedia content automatically. Certain embodiments thereby avoid the need for interactions between multiple entities (e.g., the technician, the content provider) to individually distribute multimedia content to the digital-signage devices.

In FIG. 1, the content-management application 102 identifies a virtual-display object 110 that includes a content identifier 112 and is associated with a playlist 114 storing multimedia-content items. The content identifier 112 includes "SF", which corresponds to the San Francisco location at which the digital-signage devices 106a-n were installed and registered. The digital-signage devices 106a-n include device identifiers that end in "SF." Once the virtual-display object 110 is identified, the content-management application 102 automatically transmits that multimedia-content items of the playlist 114, such that each of the digital-signage devices 106a-c displays the transmitted multimedia-content items. In another example, the content-management application 102 identifies a virtual-display object 116 that is associated with a content identifier 118 and a playlist 120 storing its respective multimedia-content items. The content identifier 118 includes "NY", which corresponds to the New York location at which the digital-signage devices 108a-n were installed and registered. The digital-signage devices 108a-n include device identifiers that begin in "NY." Once the virtual-display object 116 is identified, the content-management application 102 automatically transmits that multimedia-content items of the playlist 120, such that each of the digital-signage devices 108a-c displays the transmitted multimedia-content items.

Figure 2:
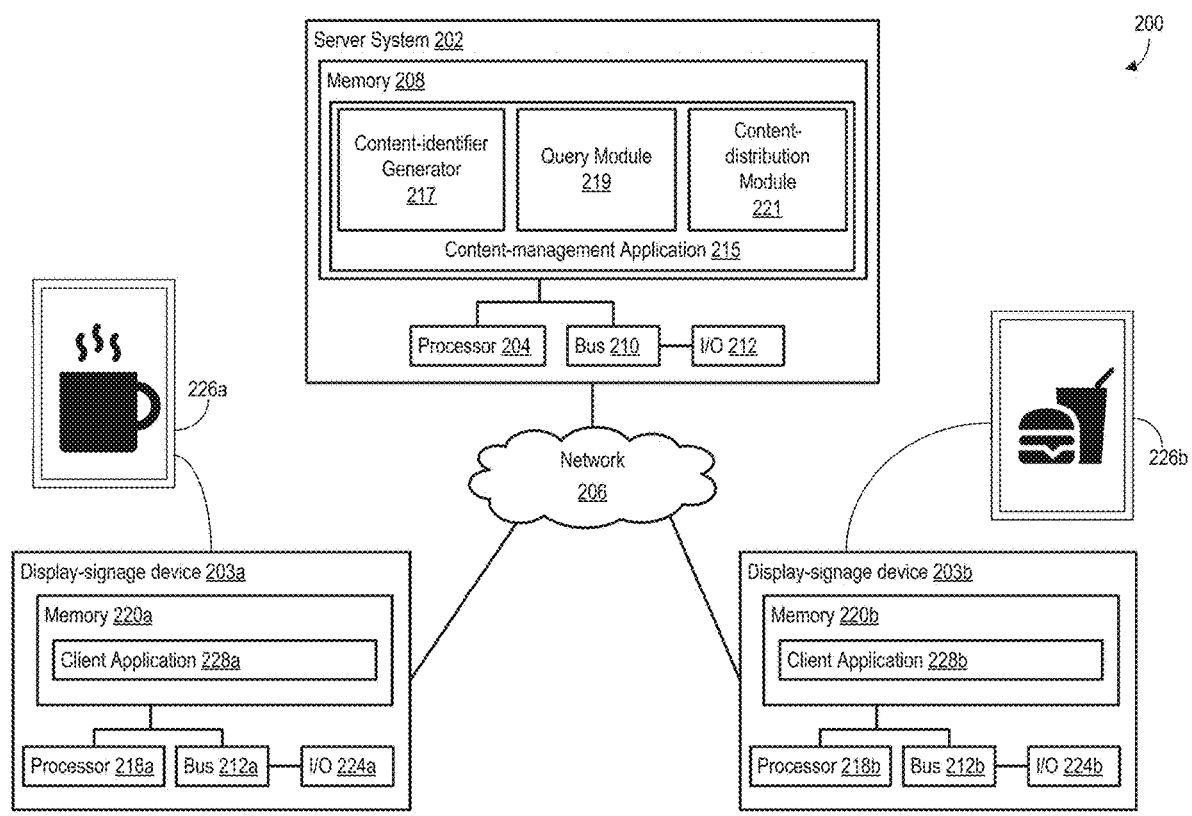
FIG. 2 illustrates a computing environment for distributing multimedia content to digital signage devices, in accordance with some embodiments.

B. Example Computing Environment for Distributing Multimedia Content to Digital Signage Devices FIG. 2 illustrates a computing environment 200 for distributing multimedia content to digital signage devices, in accordance with some embodiments. The computing systems in this example include a server system 202 and digital-signage devices 203a and 203b in communication via a network 206.

The server system 202 includes a processor 204 that is communicatively coupled to a memory 208 and that executes computer-executable program instructions and/or accesses information stored in the memory 208. The processor 204 may include a microprocessor, an application-specific integrated circuit ("ASIC"), a state machine, or other suitable processing device. The processor 204 can include any of a number of computer processing devices, including one. Such a processor can include or may be in communication with a computer-readable medium storing instructions that, when executed by the processor 204, cause the processor to perform the steps described herein.

The server system 202 can distribute multimedia-content items stored in a database server. A multimedia-content item includes images and/or video files configured to be displayed on a given digital signage device. In some instances, the multimedia-content item include interactive content, which facilitates interactions with the multimedia content as it is being displayed on the digital signage device. For example, a digital-signage device installed on a department store can display a map that identifies locations of certain clothing items. A user can then interact with the map to find a location at which a particular clothing item is provided.

The multimedia-content item is associated with a content identifier. The content identifiers are used to identify digital-signage devices for which the corresponding multimedia-content items are transmitted. In some instances, multimedia-content items with the content identifier are transmitted automatically to any digital-signage devices including device identifiers (e.g., a device name, registered location) that, in whole or in part, match the content identifier. In effect, the content identifier includes information that specify how the multimedia content should be distributed to the digital-signage devices. For example, a content identifier identifies a location, in which digital-signage devices having host names that indicate their installation at such location can receive multimedia content that are associated with the content identifier. In another example, another content identifier identifies a set of alphanumerical characters, in which digital-signage devices having serial numbers that include the set of alphanumerical characters can receive multimedia content that are associated with the other content identifier.

A content-management application 215 (e.g., the content-management application 102 of FIG. 1) stored in the memory 208 can configure the processor 204 to identify and transmit multimedia content for one of digital-signage devices 203a-b. The content-management application 215 can configure the processor 204 to access the multimedia-content items stored in the memory 208, based on a determination of their content identifiers matching at least part of the device identifiers of the digital-signage devices 203a-b. The content-management application 215 may additionally provide a social media service, a cloud service, or other network service that can be accessed by the digital-signage devices 203a-b. A cloud service can include a collection of computing resources, including computing systems and/or applications, that can be provided as an online service via a data network. The collection of computing systems and/or hardware can be represented as a single service. The cloud service can provide a digital hub for browsing, creating, sharing, and otherwise using electronic content using one or more applications provided via the cloud service.

The content-management application 215 detects registration of a digital-signage device (e.g., the digital-signage device 203a). The content-management application 215 executes one or more data-processing rules to identify content identifiers that matches at least part of the device identifiers of the digital-signage devices 203a-b. The data-processing rules includes a search syntax that specifies how the device identifiers should match the corresponding content identifiers. For example, for a search syntax includes "start with . . . ", the content-management application 215 determines that the device identifier matches a content identifier if the device identifier begins with the alphanumerical characters indicated by the content identifier. The multimedia content associated with the content identifiers are then automatically transmitted to the corresponding digital-signage devices (e.g., the digital-signage device 108b).

In some instances, the content-management application 215 includes the following modules to identify and distribute multimedia content to digital-signage devices: (i) a content-identifier generator 217 for generating one or more content identifiers; (ii) a query module 219 for executing data-processing rules to identify multimedia content having a content identifier that matches at least part of a device identifier; and (iii) a content-distribution module 221 for transmitting the multimedia content to the digital-signage devices. The above modules can be used individually or in different combinations to allow the content-management application 215 to distribute different multimedia content based on device identifiers of the digital-signage devices.

The content-identifier generator 217 is configured to generate a content identifier for one or more multimedia-content items, such that the multimedia-content items with the content identifier can be transmitted automatically to any digital-signage devices having device identifiers that match the content identifier. As a result, the content identifier includes information (e.g., location of the digital-signage device, serial number of the digital-signage device) that indicate digital-signage devices for which the multimedia content should be distributed. The content-identifier generator 217 is configured to avail a graphical user interface to allow creation, modification, or deletion of the content identifier. Additionally or alternatively, the content-identifier generator 217 generates a content identifier for a virtual display object. The virtual-display object can be associated with one or more playlists of multimedia-content items, such that the one or more content identifiers of the virtual-display object are applied to all of the multimedia-content items stored in the playlists. Once the virtual-display object is generated and stored in a database, the content-management application 215 can access and transmit the multimedia-content items associated with the virtual-display object to a digital-signage device, if the one or more content identifiers of the virtual-display object matches at least part of a device identifier of the digital-signage device (e.g., the digital-signage device 203*a*).

The query module 219 is configured to detect registration of a digital-signage device (e.g., the digital-signage device 203*a*) and execute one or more data-processing rules to identify a content identifier that matches at least part of the device identifiers of the digital-signage devices 203*a-b*. Each of the data-processing rules includes a search syntax that specifies how the device identifiers should match the corresponding content identifiers. For example, for a search syntax includes "start with . . . ", the query module 219 determines that the device identifier matches a content identifier if the device identifier begins with the alphanumerical characters indicated by the content identifier. Other types of data-processing rules can be executed by the query module 219 to identify the matching content identifiers, including but not limited to "contains . . . ", "ends with . . . ", "contains . . . NOT . . . ", "contains . . . AND . . . ", and "contains . . . OR . . . ".

The content-distribution module 221 is configured to determine multimedia-content items (e.g., images, videos) that include the content identifier identified by the query module 219 and transmit the multimedia-content items to the digital-signage devices (e.g., the digital-signage device 203*a*). In some instances, if the content identifier identifies a virtual-display object, the content-distribution module 221 determines playlists associated with the virtual-display object and multimedia-content items that are stored in the playlists. The content-distribution module 221 transmits the multimedia-content items to the digital-signage device over a communication network, which facilitates the digital-signage device to display at least one multimedia-content item of the determined multimedia-content items.

Referring back to FIG. 2, the server system 202 may also include a number of external or internal devices, such as input or output devices. For example, the server system 202 is shown with an input/output ("I/O") interface 212. A bus 210 can also be included in the server system 202. The bus 210 can communicatively couple one or more components of the server system 202. The server system 202 can include any suitable computing system for hosting the content-management application 215. In one embodiment, the server system 202 may be a single computing system. In another embodiment, the server system 202 may be a virtual server implemented using a number of computing systems connected in a grid or cloud computing topology.

Each of the digital-signage devices 203*a* and/or 203*b* includes a computer-readable medium, such as processors 218*a* and/or 218*b*, respectively. Each of the processors 218*a* and/or 218*b* is communicatively coupled to a memory 220*a* and/or 220*b*, respectively. Each of the processors 218*a* and/or 218*b* respectively executes computer-executable program instructions and/or accesses information stored in the memory 220*a* and/or 220*b*. Each of the processors 218*a* and/or 218*b* may include a microprocessor, an ASIC, a state machine, or other processor. Each of the processors 218*a* and/or 218*b* can include any of a number of computer processing devices, including one. Such a processor can include or may be in communication with a computer-readable medium. The computer-readable medium stores instructions that when executed by the processor, cause the processor to perform the steps described herein.

The digital-signage devices 203*a* and/or 203*b* may also include a number of external or internal devices, such as a display, audio speakers, one or more microphones, or any other input or output devices. For example, each of the digital-signage devices 203*a* and/or 203*b* is respectively shown with input/output ("I/O") interfaces 224*a*, 224*b* and display devices 226*a*, 226*b*. Buses can be respectively included in the digital-signage devices 203*a* and/or 203*b*. Each of the buses can communicatively couple one or more components of the digital-signage devices 203*a* and/or 203*b*.

FIG. 2 also illustrates the client applications 228*a* and/or 228*b* respectively included in the memory 220*a* and/or 220*b* of the digital-signage devices 203*a* and/or 203*b*. Each of the client applications 228*a* and/or 228*b* can include one or more software modules. The client applications 228*a* and/or 228*b* can respectively configure the processors 218*a* and/or 218*b* to modify or otherwise access the multimedia content provided by the server system 202 via the network 206. The client applications 228*a* and/or 228*b* can respectively configure the processors 218*a* and/or 218*b* to respectively register the digital-signage devices 203*a* and/or 203*b* with the content-management application 215 over the network 206. For example, each of the client applications 228*a* and/or 228*b* includes a user interface that allows a user to establish a network session between the digital-signage devices 203*a* and/or 203*b* and the server system 202 via the network 206.

In some embodiments, the digital-signage devices 203*a* and/or 203*b* can be connected to any suitable client devices for communicating via a network 206 and executing the client applications 228*a* and/or 228*b*. Non-limiting examples of a computing device include a desktop computer, a tablet computer, a smart phone, or any other computing device suitable for using electronic content. In other embodiments, the digital-signage devices 203*a* and/or 203*b* include server systems for providing electronic content items via the client applications 228*a* and/or 228*b*.

Figure 3:
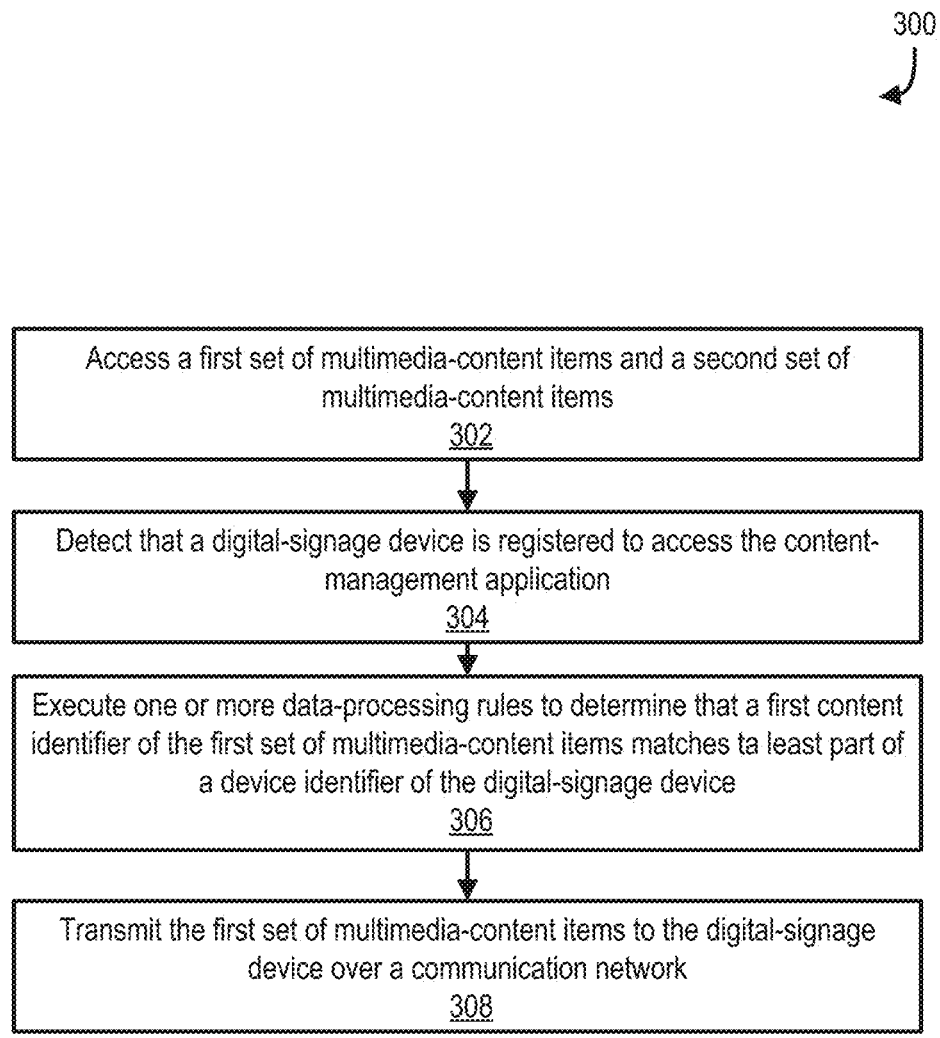
FIG. 3 illustrates a process for distributing multimedia content to digital signage devices, in accordance with some embodiments.

C. Example Process for Distributing Multimedia Content to Digital Signage Devices FIG. 3 illustrates a process 300 for distributing multimedia content to digital signage devices, in accordance with some embodiments. For illustrative purposes, the process 300 is described with reference to the components illustrated in FIG. 2, though other implementations are possible. For example, the program code for content-management application 215 of FIG. 2, which is stored in a non-transitory computer-readable medium, is executed by one or more processing devices to cause the server system 202 to perform one or more operations described herein.

At step 302, the content-management application accesses a first set of multimedia-content items and a second set of multimedia-content items. A multimedia-content item of the first or second sets of multimedia-content items includes a video file, an image file, or an audio file. In some instances, the multimedia-content item include interactive content, which facilitates interactions with the multimedia content as it is being displayed on the digital signage device.

The first set of multimedia-content items are associated with a first content identifier. The second set of multimedia-content items are associated with a second content identifier, in which the first content identifier is different from the second content identifier. For example, the first content identifier identifies a first location ("SF"), and the second content identifier identifies a second location ("NY"). Different content identifiers can thus be used to determine which multimedia-content items should be transmitted to the digital-signage device. Each of the first or second content identifier is configured to include an expression that matches at least part of a device identifier of a digital-signage device, at which the corresponding multimedia-content items are distributed to the digital-signage device having the device identifier. In some instances, the content-management application associates the first set of multimedia-content items with the first content identifier by: (i) generating a virtual-display object that includes the first content identifier; and (ii) associating the virtual-display object with the first set of multimedia-content items.

At step 304, the content-management application detects that a digital-signage device is registered to access the content-management application. The digital-signage device includes a device identifier that includes information that identify one or more characteristics of the digital-signage device. For example, the device identifier includes information indicative of the digital-signage device being installed at a particular location. In another example, the device identifier includes a serial number of the digital-signage device. In some instances, the content-management application modifies the device identifier of the digital-signage device prior to the registration of the digital-signage device. As a result, the multimedia-content items are identified based on the modified device identifier of the digital-signage device.

In some instances, the digital-signage device is previously enrolled in an asset-management system. The digital-signage device is automatically registered to the content-management application as the digital-signage device is connected over a communication network. Additionally or alternatively, an administrator registers the digital-signage device to the content-management application by: (i) connecting the digital-signage device to the content-management application using its administrator credentials; and (ii) submitting the serial number of the digital-signage device to complete registration.

At step 306, the content-management application executes one or more data-processing rules to determine that the first content identifier matches at least part of the device identifier of the digital-signage device. Each of the data-processing rules includes a search syntax that specifies how the device identifiers should match the corresponding content identifiers. For example, for a search syntax that includes "start with . . . ", the content-management application determines that the device identifier matches a content identifier if the device identifier begins with the alphanumerical characters indicated by the content identifier. Other types of data-processing rules can be executed by the query module 219 to identify the matching content identifiers, including but not limited to "contains . . . ", "ends with . . . ", "contains . . . NOT . . . ", "contains . . . AND . . . ", and "contains . . . OR . . . ".

At step 308, the content-management application transmits the first set of multimedia-content items to the digital-signage device over a communication network, in response to determining that the first content identifier matches at least part of the device identifier. Transmitting the first set of multimedia-content items facilitates the digital-signage device to display at least one multimedia-content item of the first set of multimedia-content items.

In some instances, the content-management application automatically distributes the second set of multimedia-content items as additional digital-signage devices are registered. For example, the content-management system detects that another digital-signage device is registered to access the content-management application. In response to detecting that the other digital-signage device is registered, the content-management application executes the one or more data-processing rules to determine that the second content identifier matches at least part of another device identifier of the other digital-signage device. In response to determining that the second content identifier matches at least part of the other device identifier, the content-management application transmits the second set of multimedia-content items to the other digital-signage device over the communication network. As a result of the transmittal, the other digital-signage device can display at least one multimedia-content item of the second set of multimedia-content items. Process 300 terminates thereafter.

III. VARIOUS CONFIGURATIONS FOR DISTRIBUTING MULTIMEDIA CONTENT TO DIGITAL-SIGNAGE DEVICES

A. Content Identifiers

Figure 4:
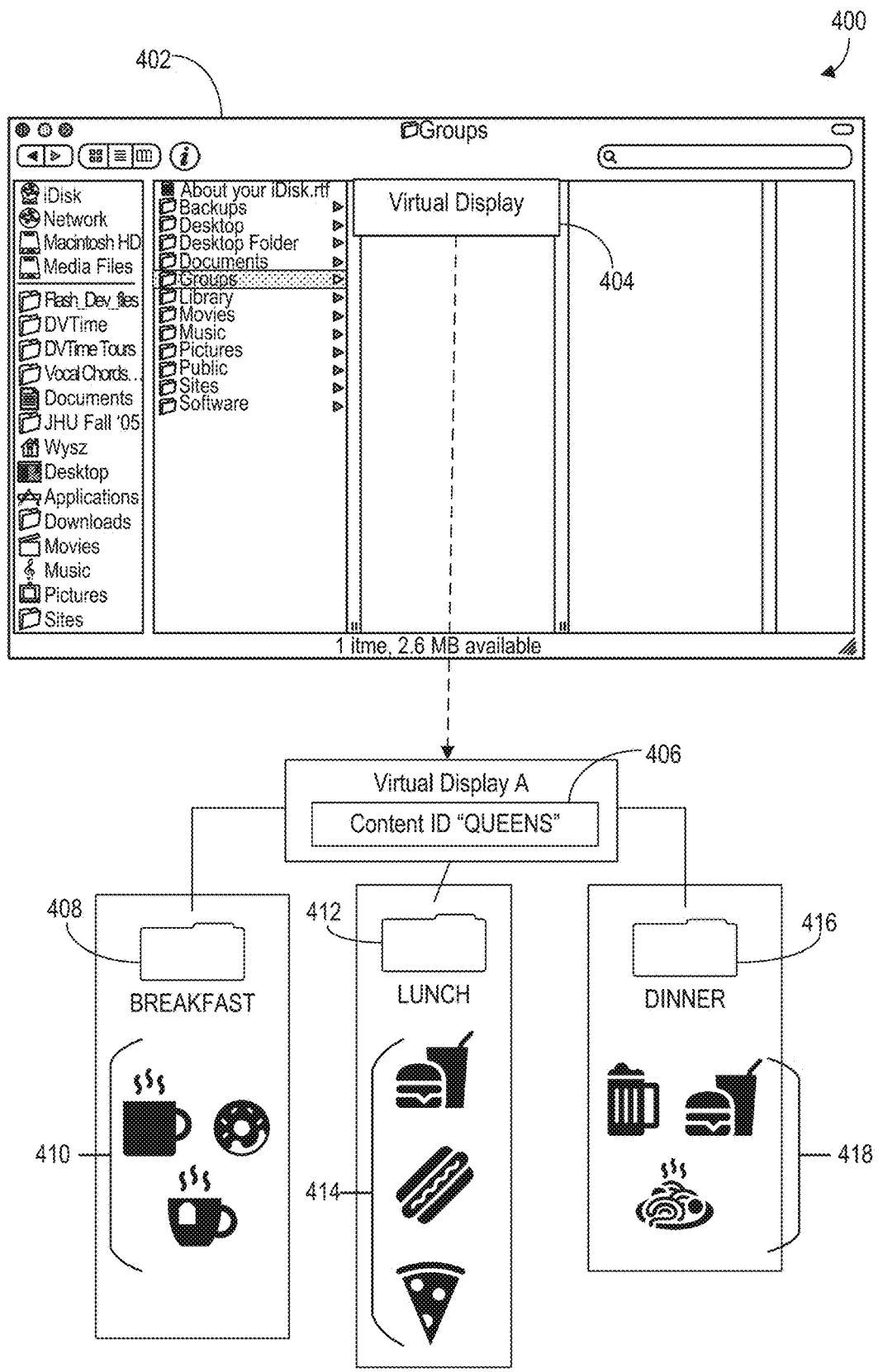
FIG. 4 illustrates an example schematic diagram for configuring content identifiers, in accordance with some embodiments.

FIG. 4 illustrates an example schematic diagram 400 for configuring content identifiers, in accordance with some embodiments. In FIG. 4, a file-manager application 402 displays one or more folders, which can be navigated by a user to access different data items including multimedia-content items. The file-manager application 402 displays a virtual-display object 404, which is a data object or a data container that was generated by a content-management application (e.g., the content-management application 102 of FIG. 1) and includes a content identifier 406. The content identifier 406 includes information that identify the digital-signage devices to which the multimedia content should be distributed. For example, the content identifier 408 identifies a location "QUEENS", at which digital-signage devices installed in Queens, New York can receive multimedia content that are associated with virtual-display object 404 having the content identifier.

The content-management application associates the virtual-display object 404 with playlists 408, 412, and 416, such that the content identifier 406 of the virtual-display object 404 is applied to all of the multimedia-content items stored in the playlists 408, 412, and 416. Each of the playlists 408, 412, and 416 is a data object that stores one or more multimedia-content items and is configured to specify how the corresponding multimedia-content items should be displayed by a digital-signage device. The playlist 408 identified as "BREAKFAST" includes multimedia-content items 410, the playlist 412 identified as "LUNCH" includes multimedia-content items 414, and the playlist 416 identified as "DINNER" includes multimedia-content items 418. In addition, the playlist 412 is configured to instruct the digital-signage device to display each of the multimedia-content items 410 in a sequence, and the playlist 414 is configured to instruct the digital-signage device to display the multimedia-content items 414 in a single page.

In some instances, each of the playlists 408, 412, and 416 includes additional configurations that specify how the corresponding multimedia-content items should be displayed by a digital-signage device. For example, the playlist 408 identified as "BREAKFAST" specifies the digital-signage device to display the multimedia-content items 410 between 7:00-10:30 AM in a sequential order, the playlist 412 identified as "LUNCH" specifies the digital-signage device to display all of the multimedia-content items 414 between 11:00-4:00 PM in a single page, and the playlist 416 identified as "DINNER" specifies the digital-signage device to display the multimedia-content items 418 between 4:00-10:00 PM in a random order. In effect, the digital-signage device receiving the first and second playlists can display the multimedia content in accordance with the specifications indicated by the first and second playlists.

Once the virtual-display object 404 is generated and stored in a database, the content-management application can automatically transmit the multimedia-content items 410, 414, and 418 associated with the virtual-display object 404 to any digital-signage devices having device identifiers (e.g., a device name, registered location) that substantially match the content identifier 408. For example, if the content identifier 406 (e.g., "SF") matches one or more characters of the device name of the digital-signage device (e.g., "SF_device_99"), the content-management application can automatically transmit the multimedia-content items 410, 414, and 418 to the digital-signage device.

B. Configuring Digital-Signage Devices

Figure 5:
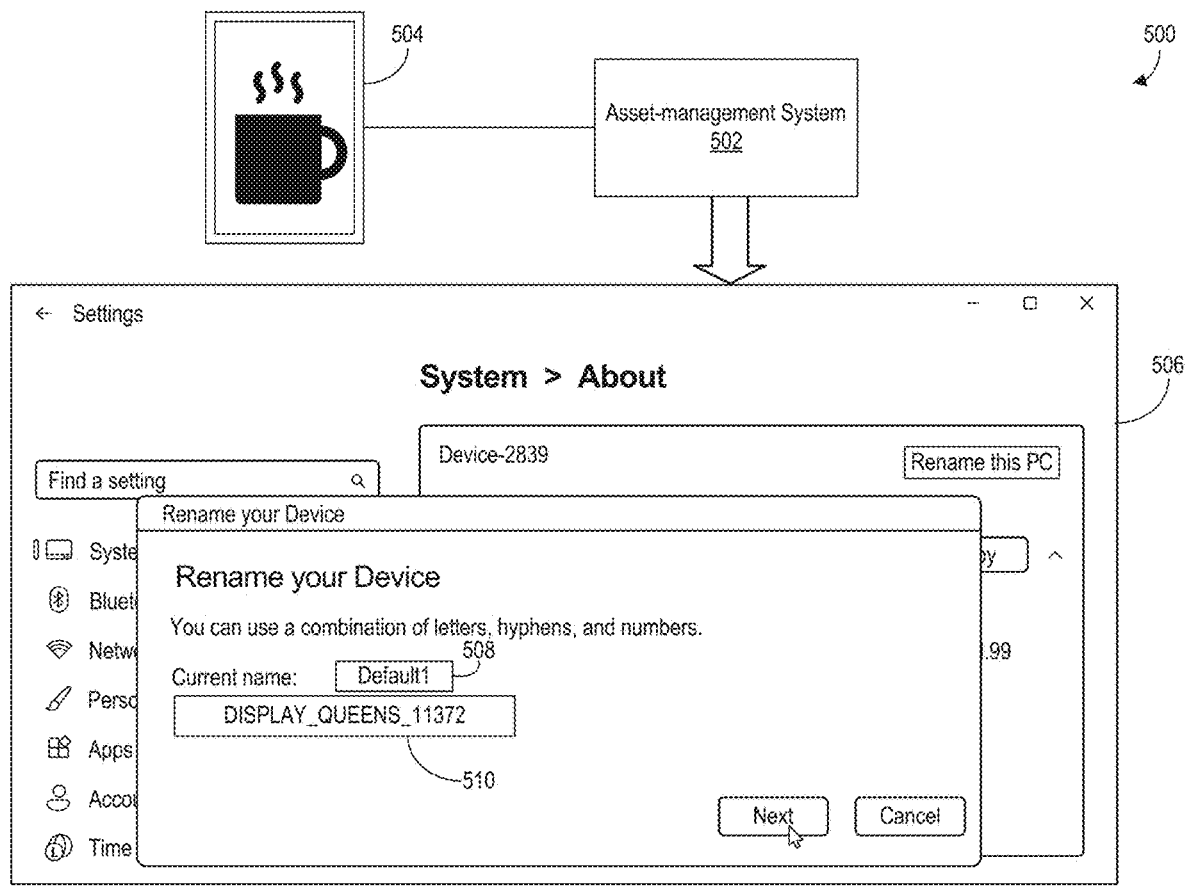
FIG. 5 illustrates an example schematic diagram for configuring digital-signage devices to access multimedia-content items, in accordance with some embodiments.

FIG. 5 illustrates an example schematic diagram 500 for configuring digital-signage devices to access multimedia-content items, in accordance with some embodiments. As shown in FIG. 5, an asset-management system 502 accesses a device identifier (e.g., a device name 508) of a digital-signage device 504. For example, the asset-management system 502 accesses a device name 508 of the digital-signage device 504 via a device settings screen 506, in which the device name 508 is identified as "Default1." To facilitate selection and distribution of multimedia-content items to the digital-signage device 504, the asset-management system modifies the device name 508 to a new device name 510, in which the device name 510 is identified as "DISPLAY_QUEENS_11372," in which 11372 corresponds to a zip code of Jackson Heights that is located in Queens County, New York and QUEENS corresponds to Queens County, New York.

In some instances, modifying the device identifiers of digital-signage devices differs based on their respective operating systems. For example, for Microsoft Windows®, the asset-management system 502 can access properties settings of the Windows® operating system and modify the hostname of the digital-signage device. For Chrome OS™, the asset-management system 502 modifies device properties of the digital-signage device to include the content identifier as part of the enterprise device enrollment in the Chrome Management Console. Different techniques for modifying the device identifiers can be contemplated by one ordinarily skilled in the art.

Other types of device identifiers of the digital-signage device 504 can be added or modified by the asset-management system 502. For example, the asset-management system 502 can modify a serial number of the digital-signage device 504 to include the text "QUEENS" or "DISCOUNT". As a result, the asset-management system 502 can modify device identifiers of the digital-signage device 504 to increase efficiency in identifying the corresponding multimedia-content items.

C. Distributing Multimedia-Content Items to Digital-Signage Devices

Figure 6:
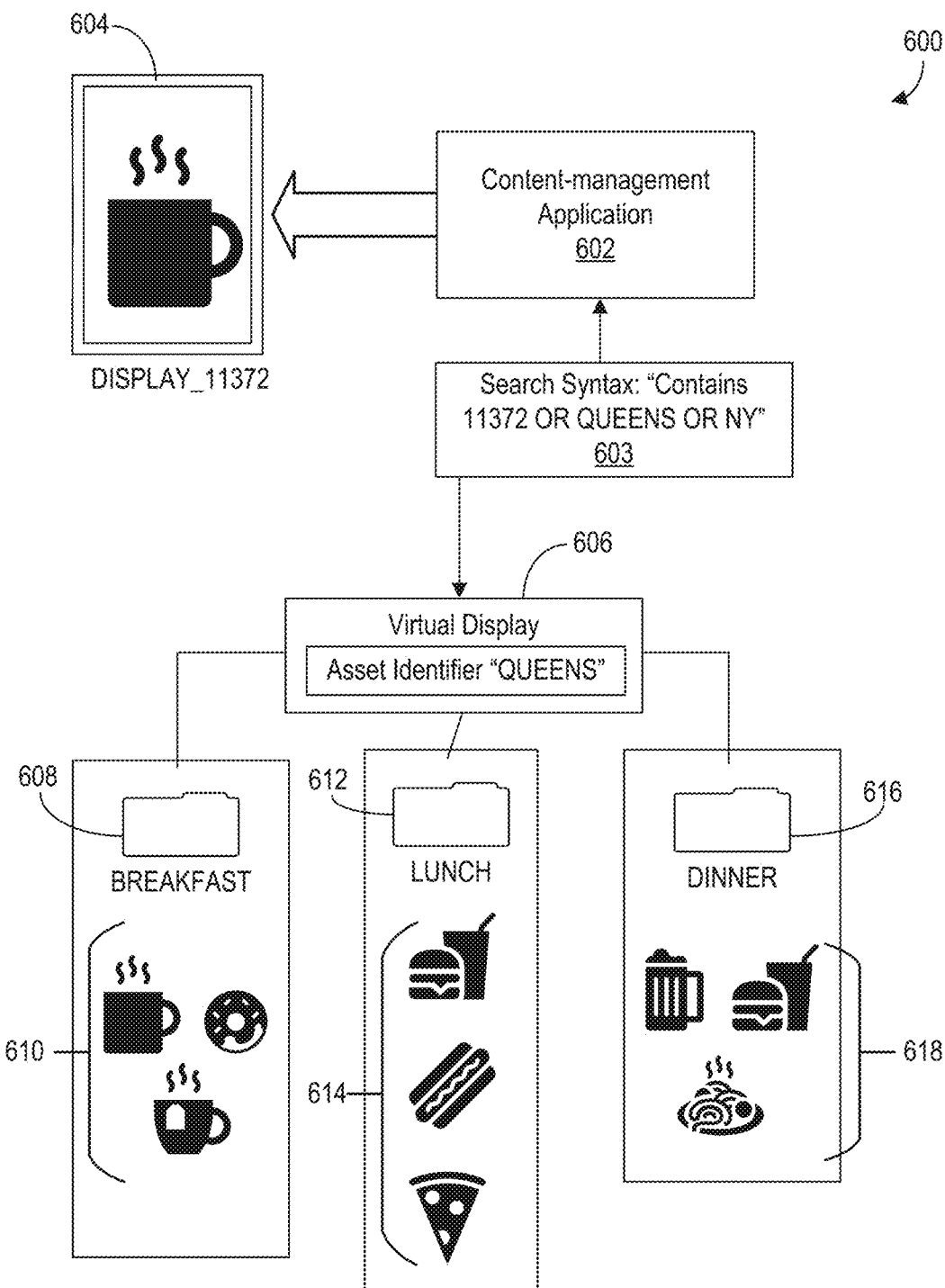
FIG. 6 illustrates an example schematic diagram for distributing multimedia-content to digital-signage devices using content identifiers, in accordance with some embodiments.

FIG. 6 illustrates an example schematic diagram 600 for distributing multimedia-content to digital-signage devices using content identifiers, in accordance with some embodiments. In FIG. 6, the distribution of multimedia content is initiated by a content-management application 602 detecting registration of a digital-signage device 604 at its corresponding location. The digital-signage device 608 includes a device identifier "DISPLAY_QUEENS_11372", which is indicative of the digital-signage device 608 being installed and registered in a restaurant located in Jackson Heights, Queens County, New York. As the digital-signage device 604 is registered, the content-management application 602 generates a search syntax 603 that includes part of the device name of the digital-signage device. The search syntax 603 include search parameters such as "11372 OR QUEENS OR NY", which causes the content-management application 602 to identify content identifiers that include one of the above search parameters.

The content-management application 602 executes the search query 603 to identify a virtual-display object 606 that includes the content identifier "QUEENS". In particular, the content-management application 602 determines that the parameter "QUEENS" of the search parameters "11372 OR QUEENS OR NY" matches the content identifier of the virtual-display object 606. The content-management application 602 identifies multimedia-content items 610, 614, and 618 that are associated with the virtual-display object 606 and transmits the multimedia-content items 610, 614, and 618 to the digital-signage device 604 for display.

As further shown in FIG. 6, the virtual-display object 406 includes playlists 608, 612, and 616, such that the content identifier of the virtual-display object 606 is applied to all of the multimedia-content items stored in the playlists 608, 612, and 616. The playlist 608 identified as "BREAKFAST" includes multimedia-content items 610, the playlist 612 identified as "LUNCH" includes multimedia-content items 614, and the playlist 616 identified as "DINNER" includes multimedia-content items 618. In addition, the playlist 608 specifies the digital-signage device to display the multimedia-content items 610 between 7:00-10:30 AM in a sequential order, the playlist 612 identified as "LUNCH" specifies the digital-signage device to display all of the multimedia-content items 614 between 11:00-4:00 PM in a single page, and the playlist 616 identified as "DINNER" specifies the digital-signage device to display the multimedia-content items 618 between 4:00-10:00 PM in a random order. In response to receiving transmission of the virtual-display object 606 from the content-management application 602, the digital-signage device 604 displays the multimedia-content items 610, 614, and 618, in accordance with the specifications indicated by the respective playlists 608, 612, and 616.

IV. EXAMPLE OF A COMPUTING ENVIRONMENT

Figure 7:
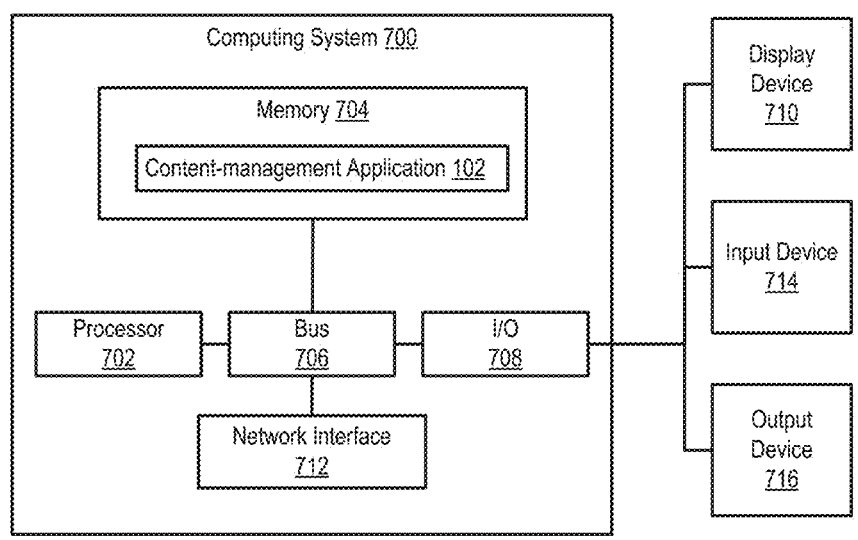
FIG. 7 depicts a computing system configured for distributing multimedia content in digital-signage devices, in accordance with some embodiments.

Any suitable computing system or group of computing systems can be used for performing the operations described herein. For example, FIG. 7 depicts a computing system 700 that can implement any of the computing systems or environments discussed above. In some embodiments, the computing system 700 includes a processing device 702 that executes the content-management application 102, a memory that stores various data computed or used by the content-management application 102, an input device 714 (e.g., a mouse, a stylus, a touchpad, a touchscreen), and an output device 716 that presents output to a user (e.g., a display device that displays graphical content generated by the content-management application 102). For illustrative purposes, FIG. 7 depicts a single computing system on which the content-management application 102 is executed, and the input device 714 and output device 716 are present. But these applications, datasets, and devices can be stored or included across different computing systems having devices similar to the devices depicted in FIG. 7.

The example of FIG. 7 includes a processing device 702 communicatively coupled to one or more memory devices 704. The processing device 702 executes computer-executable program code stored in a memory device 704, accesses information stored in the memory device 704, or both. Examples of the processing device 702 include a microprocessor, an application-specific integrated circuit ("ASIC"), a field-programmable gate array ("FPGA"), or any other suitable processing device. The processing device 702 can include any number of processing devices, including a single processing device.

The memory device 704 includes any suitable non-transitory, computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 700 may also include a number of external or internal devices, such as a display device 710, or other input or output devices. For example, the computing system 700 is shown with one or more input/output ("I/O") interfaces 708. An I/O interface 708 can receive input from input devices or provide output to output devices. One or more buses 706 are also included in the computing system 700. Each bus 706 communicatively couples one or more components of the computing system 700 to each other or to an external component.

The computing system 700 executes program code that configures the processing device 702 to perform one or more of the operations described herein. The program code includes, for example, code implementing the content-management application 102 or other suitable applications that perform one or more operations described herein. The program code may be resident in the memory device 704 or any suitable computer-readable medium and may be executed by the processing device 702 or any other suitable processor. In some embodiments, all modules in the content-management application 102 are stored in the memory device 704, as depicted in FIG. 7. In additional or alternative embodiments, one or more of these modules from the content-management application 102 are stored in different memory devices of different computing systems.

In some embodiments, the computing system 700 also includes a network interface device 712. The network interface device 712 includes any device or group of devices suitable for establishing a wired or wireless data connection to one or more data networks. Non-limiting examples of the network interface device 712 include an Ethernet network adapter, a modem, and/or the like. The computing system 700 is able to communicate with one or more other computing devices (e.g., a computing device that receives inputs for content-management application 102 or displays outputs of the content-management application 102) via a data network using the network interface device 712.

An input device 714 can include any device or group of devices suitable for receiving visual, auditory, or other suitable input that controls or affects the operations of the processing device 702. Non-limiting examples of the input device 714 include a touchscreen, stylus, a mouse, a keyboard, a microphone, a separate mobile computing device, etc. An output device 716 can include any device or group of devices suitable for providing visual, auditory, or other suitable sensory output. Non-limiting examples of the output device 716 include a touchscreen, a monitor, a separate mobile computing device, etc.

Although FIG. 7 depicts the input device 714 and the output device 716 as being local to the computing device that executes the content-management application 102, other implementations are possible. For instance, in some embodiments, one or more of the input device 714 and the output device 716 include a remote client-computing device that communicates with the computing system 700 via the network interface device 712 using one or more data networks described herein.

V. GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A method comprising:
   accessing, by a content-management application executed by a server connected to multiple digital-signage devices via a communication network, a first set of multimedia-content items and a second set of multimedia-content items, wherein the first set of multimedia-content items are associated with a first content identifier, wherein the second set of multimedia-content items are associated with a second content identifier, wherein the first content identifier is different from the second content identifier;
   detecting, by the content-management application, that a digital-signage device is registered to access the content-management application via the communication network, wherein the digital-signage device is associated with a device identifier;
   in response to detecting that the digital-signage device is registered, executing, by the content-management application, one or more data-processing rules to determine that the first content identifier matches at least part of the device identifier of the digital-signage device, wherein the one or more data-processing rules comprise a search syntax indicating that a content identifier of a particular multimedia-content item matches at least part of the device identifier if the device identifier begins with one or more alphanumerical characters that correspond to the content identifier of the particular multimedia-content item; and
   in response to determining that the first content identifier matches at least part of the device identifier of the digital-signage device, transmitting, by the content-management application, the first set of multimedia-content items to the digital-signage device over the communication network, wherein transmitting the first set of multimedia-content items facilitates the digital-signage device to display at least one multimedia-content item of the first set of multimedia-content items.

2. The method of claim 1, further comprising:
   detecting, by the content-management application, that another digital-signage device is registered to access the content-management application via the communication network, wherein the other digital-signage device is associated with another device identifier;
   in response to detecting that the other digital-signage device is registered, executing, by the content-management application, the one or more data-processing rules to determine that the second content identifier matches at least part of the other device identifier of the other digital-signage device; and
   in response to determining that the second content identifier matches at least part of the other device identifier of the other digital-signage device, transmitting, by the content-management application, the second set of multimedia-content items to the other digital-signage device over the communication network, wherein transmitting the second set of multimedia-content items facilitates the other digital-signage device to display at least one multimedia-content item of the second set of multimedia-content items.

3. The method of claim 1, wherein the device identifier includes a device name of the digital-signage device, a location at which the digital-signage device will be installed, an operating system associated with the digital-signage device, or a device serial number of the digital-signage device.

4. The method of claim 1, wherein a multimedia-content item of the first set of multimedia-content items or the second set of multimedia-content items includes a video file, an image file, an audio file.

5. The method of claim 1, wherein the first content identifier identifies a location of the digital-signage device on the communications network.

6. The method of claim 1, further comprising associating the first set of multimedia-content items with the first content identifier, wherein the associating includes:
   generating a virtual-display object that includes the first content identifier; and
   associating the virtual-display object with the first set of multimedia-content items.

7. A system comprising:
   a content-management application executed by a server connected to multiple digital-signage devices via a communication network, wherein the content-management application comprises a content-identifier generator, a query module, and a content-distribution module;
   wherein the content-identifier generator is configured to generate, for each multimedia-content item of a plurality of multimedia-content items stored in a database system, a content identifier of the multimedia-content item;

wherein the query module is configured to:
  detect registration of a digital-signage device to access a content-management application via the communication network, wherein the digital-signage device is associated with a device identifier; and
  execute one or more data-processing rules to determine that a content identifier of a particular multimedia-content item of the plurality of multimedia-content items matches at least part of the device identifier of the digital-signage device, wherein the one or more data-processing rules comprise a search syntax indicating that the content identifier of the particular multimedia-content item matches at least part of the device identifier if the device identifier begins with one or more alphanumerical characters that correspond to the content identifier of the particular multimedia-content item; and
wherein the content-distribution module is configured to:
  access the particular multimedia-content item from the database system; and
  transmit the particular multimedia-content item to the digital-signage device over the communication network, wherein transmitting the particular multimedia-content item facilitates the digital-signage device to display the particular multimedia-content item.

8. The system of claim 7, wherein the content identifier of the particular multimedia-content item includes information that identifies a location at which the digital-signage device is being installed, a serial number of the digital-signage device, or a device name of the digital-signage device.

9. The system of claim 7, wherein the content-identifier generator is further configured to provide a graphical user interface to allow creation, modification, or deletion of the content identifier.

10. The system of claim 7, wherein generating the content identifier of the multimedia-content item includes:
  generating a virtual-display object that includes a first content identifier; and
  associating the virtual-display object with a set of multimedia-content items, such that each of the set of multimedia-content items is associated with the first content identifier.

11. The system of claim 10, wherein the set of multimedia-content items are stored in a playlist, wherein the playlist specifies an order in which the set of multimedia-content items are presented on the digital-signage device.

12. The system of claim 7, wherein the device identifier includes a device name of the digital-signage device, a location at which the digital-signage device will be installed, an operating system associated with the digital-signage device, or a device serial number of the digital-signage device.

13. The system of claim 7, wherein each multimedia-content item of the plurality of multimedia-content items includes a video file, an image file, and an audio file.

14. A computer program product tangibly embodied in a non-transitory machine-readable storage medium including instructions configured to cause one or more processing devices to perform actions including:
  detecting that a plurality of digital-signage devices are registered to access a content-management application executed by a server connected to a communication network with multiple digital-signage devices, wherein each of the plurality of digital-signage devices includes a respective device identifier;
  a step for executing one or more data-processing rules to identify a content identifier that matches at least part of each device identifier of a set of digital-signage devices of the plurality of digital-signage devices, wherein the one or more data-processing rules comprise a search syntax indicating that a content identifier of a particular multimedia-content item matches at least part of the device identifier if the device identifier begins with one or more alphanumerical characters that correspond to the content identifier of the particular multimedia-content item;
  identifying a playlist associated with the content identifier, wherein the playlist stores one or more multimedia-content items; and
  transmitting the one or more multimedia-content items to each of the set of digital-signage devices over the communication network, wherein transmitting the one or more multimedia-content items facilitates the set of digital-signage devices to display the one or more multimedia-content items.

15. The computer program product of claim 14, wherein the playlist specifies a time period during which each of the set of digital-signage devices displays the one or more multimedia-content items.

16. The computer program product of claim 14, wherein the playlist specifies each of the set of digital-signage devices to display the one or more multimedia-content items in a sequential order.

17. The computer program product of claim 14, wherein the playlist specifies each of the set of digital-signage devices to display the one or more multimedia-content items simultaneously.

* * * * *